US 6,613,827 B2

(12) United States Patent
Lundgard et al.

(10) Patent No.: US 6,613,827 B2
(45) Date of Patent: Sep. 2, 2003

(54) DISPERSION OF A PREFORMED POLYMER IN A POLYOL

(75) Inventors: Richard A. Lundgard, Midland, MI (US); James E. Pate, III, Sanford, MI (US); James J. Jakubowski, Midland, MI (US); Robert A. Kirchhoff, Midland, MI (US); Ralph D. Priester, Jr., Lake Jackson, TX (US); Werner A. Lidy, Shriesheim (DE)

(73) Assignee: Dow Global Technologies Inc., Midland, MI (US)

( * ) Notice: Subject to any disclaimer, the term of this patent is extended or adjusted under 35 U.S.C. 154(b) by 17 days.

(21) Appl. No.: 09/950,327

(22) Filed: Sep. 10, 2001

(65) Prior Publication Data

US 2002/0042463 A1 Apr. 11, 2002

Related U.S. Application Data

(60) Provisional application No. 60/238,140, filed on Oct. 5, 2000.

(51) Int. Cl.[7] .................................................. C08K 5/05
(52) U.S. Cl. ...................... 524/386; 524/487; 524/500; 524/502; 525/404; 525/412; 525/539
(58) Field of Search ................... 524/386, 487, 524/500, 502, 832; 525/539, 412, 404

(56) References Cited

U.S. PATENT DOCUMENTS

| | | | | |
|---|---|---|---|---|
| 3,301,829 A | | 1/1967 | Woodward et al. | 260/78.5 |
| 3,558,531 A | | 1/1971 | Ival et al. | 260/2.5 |
| 3,660,339 A | | 5/1972 | Schub, Jr. et al. | 260/29.7 D |
| 4,014,846 A | * | 3/1977 | Ramlow et al. | 524/377 |
| 4,435,537 A | * | 3/1984 | Horn et al. | 524/391 |
| 4,454,254 A | | 6/1984 | Reichel et al. | 521/136 |
| 4,575,529 A | | 3/1986 | Gibbs et al. | 524/507 |
| 4,734,204 A | | 3/1988 | Lamb | 210/708 |
| 5,086,084 A | | 2/1992 | Michaelson | 521/137 |
| 5,262,075 A | | 11/1993 | Chung et al. | 252/51.5 A |
| 5,270,399 A | | 12/1993 | Czornij et al. | 525/327.6 |
| 5,298,568 A | | 3/1994 | Suzuki | 525/327.6 |
| 5,395,895 A | * | 3/1995 | Tagoshi et al. | 525/327.7 |
| 5,496,894 A | * | 3/1996 | Critchfield et al. | 525/53 |
| 5,641,829 A | * | 6/1997 | Das et al. | 524/507 |
| 5,851,594 A | * | 12/1998 | Feder et al. | 427/387 |
| 5,859,111 A | * | 1/1999 | Kukkala et al. | 524/458 |
| 5,883,155 A | * | 3/1999 | Hoerner et al. | 523/122 |
| 5,959,032 A | | 9/1999 | Evans et al. | 525/74 |
| 6,179,458 B1 | * | 1/2001 | Albers et al. | 366/76.1 |
| 6,204,310 B1 | | 3/2001 | Choudhery | 523/348 |
| 6,265,457 B1 | | 7/2001 | Dolgopolsky et al. | 521/155 |
| 6,329,440 B2 | | 12/2001 | Scherzer et al. | 521/137 |

FOREIGN PATENT DOCUMENTS

| | | |
|---|---|---|
| EP | 0 065 872 | 12/1982 |
| EP | 0 488 166 A2 | 9/1991 |
| EP | 0 537 028 A1 | 4/1993 |
| WO | WO 00/71609 A1 | 11/2000 |

OTHER PUBLICATIONS

Chemical Abstract, 93–296565/38, "Water Dispersible or soluble polymer resin. . .", EP 561249A1, US equiv. 5,340,879.
Chemical Abstract, 92–277841/34, "Polymerization prod. of vinyl monomer in presence of alkoxylate. . .", EP499068A1.
Dow Docket No. 60786, Filed May 9, 2000, "A Continuous Process of Extruding and Mechanically Dispersing a Polymeric Resin in an Aqueous or Non–aqueous Medium".
Abstract, JP5200821 A2, "Manufacture of Ethylene Copolymer Composiition", Nov. 1991.
Abstract, EP0768324 A1, "Continuous Process for the Preparation of Highly Stable, Finely Divided, Low Polymer Polyols of Small Average Particle Size", Apr. 1997.
Chemical Abstract, 92–147674/18, "Resin compsn, For hot melt adhesive and aq. paint. . .", JP04098809A.
Chemical Abstract, 92–277841/34, "Polymerization prod. of vinyl monomer in presence of alkoxylate. . .", EP499068A1.
Chemical Abstract, 92–295511/36, "Mfr of polymer polyols with low viscosity. . .", JP04202347A.

* cited by examiner

Primary Examiner—David W. Wu
Assistant Examiner—Henry S. Hu
(74) Attorney, Agent, or Firm—Steven W. Mork

(57) ABSTRACT

The present invention provides a process for preparing a stable dispersion of a preformed polymer in a polyol in a single mixer. A preformed polymer is mixed under sufficient heat and shear to reduce its particle size to a desired size in the presence of a polyol. The present invention also provides stable dispersions of polymers in polyols and polyurethane formulations containing stable dispersions made by the process of the present invention.

14 Claims, 1 Drawing Sheet

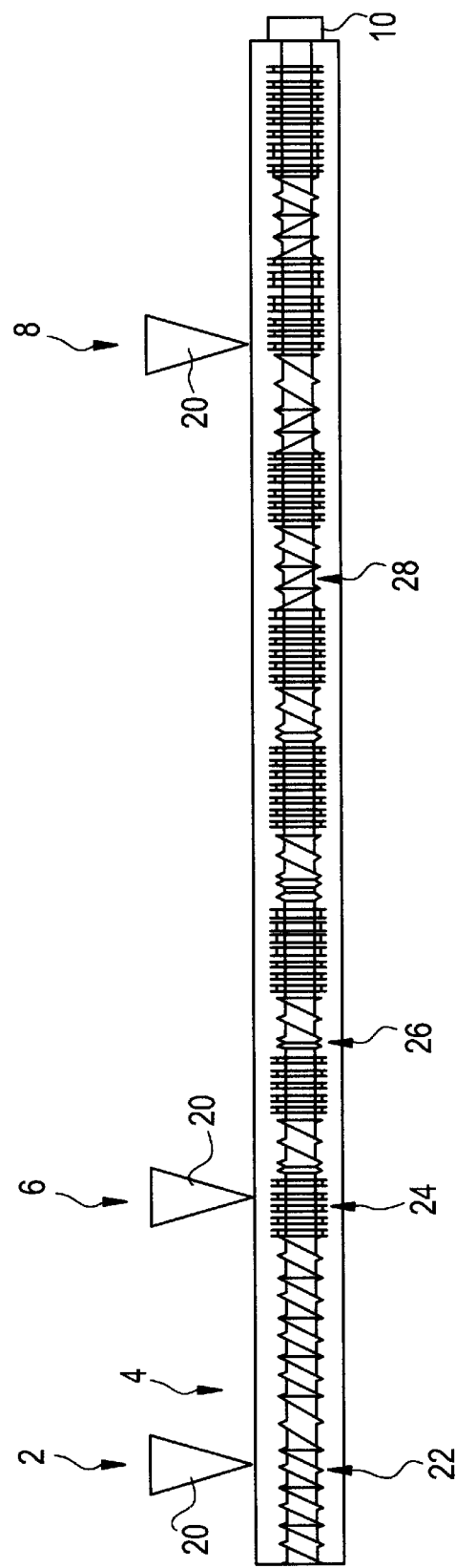

DISPERSION OF A PREFORMED POLYMER IN A POLYOL

CROSS REFERENCE STATEMENT

This application claims the benefit of U.S. Provisional Application No. 60/238,140, filed Oct. 5, 2000.

BACKGROUND OF THE INVENTION

1. Field of the Invention

The present invention relates to a stable dispersion of a preformed polymer in a polyol and a process for preparation the same.

2. Description of Related Art

Polymer polyols, which are dispersions of a polymer in a polyol, are often included as a component in making reinforced polyurethane foam. For example, styrene/acrylonitrile (SAN) polymer polyols are common components in making reinforced polyurethane foam. SAN polymer polyols are dispersion polymerized, a process unfortunately requiring anywhere from about 6 to 24 hours. Furthermore, SAN polymer is more costly than alternative polymers such as polyethylene and polypropylene.

U.S. Pat. No. 4,014,846 (Ramlow et al.) discloses polymer polyols of hydroxy-containing polymer prepared by dispersing finely divided solid particles of a hydroxy-containing polymer in a polyol. Ramlow et al. describes polymerizing polymer particles in an organic solvent, isolating the particles and then dispersing the particles in a polyol. Preparing preformed polymer particles is process intensive, requiring the polymer particles to be prepared in an organic solvent and isolated prior to being dispersed into a polyol.

Accordingly, a stable dispersion of a relatively low-cost polymer in a polyol and a process for preparing such dispersions that is less capital and labor-intensive than described in prior art is desirable. Still more desirable is a process that is faster than the SAN dispersion polymerization process.

BRIEF SUMMARY OF THE INVENTION

In a first aspect, the present invention is a process for making a stable dispersion comprising the steps: (a) contacting, in a single mixer, a preformed polymer resin and a polyol under conditions of sufficient heat and sufficient shear to form an initial dispersion of the polymer resin in the polyol; and (b) while under shear, cooling the initial dispersion sufficiently to form a stable dispersion.

In a second aspect, the present invention is a composition comprising a stable dispersion of a stabilizer and a preformed high-density or linear low-density polyethylene polymer in a polyol.

In a third aspect, the present invention is a polyurethane foam formulation comprising a dispersion of preformed polymer in polyol prepared according to the process of first aspect.

The present invention meets a need in the art by providing a stable dispersion of a relatively low-cost polymer in a polyol and a process for preparing such a stable dispersion that is less capital and labor intensive than described in prior art. Furthermore, the process of the present invention allows preparation of stable polymer in polyol dispersions in less than six hours.

Definitions

"Dispersion" refers to a dispersion at the molecular or ionic level (a true solution) or colloidal level (having particle sizes up to hundreds of microns in diameter).

"Stable dispersion" means stable to significant dispersed phase coalescence for at least a day, preferably at least a week, more preferably at least a month, still more preferably three months, even more preferably at least six months, most preferably at least a year.

"Stabilizer" refers to an interfacially active compound that stabilizes a dispersion of a polymer in a polyol.

"Single mixer" refers to a mixing device comprising one or more mixers that operate at identical mixing rates. Examples of single mixers include a beaker or tank in combination with one or more mixing blades on a single shaft and an extruder with multiple mixing elements all of which turn at the same rate. Examples of mixers which fall outside of the definition include combinations of extruders and dispersers wherein the screw(s) of the extruder operates at a different rate than the mixing head in the disperser (see for example, the extruder/disperser combination in pending U.S. patent application Ser. No. 60/35,086).

BRIEF DESCRIPTION OF DRAWINGS

FIG. 1. is a diagram of a preferred single mixer for use in the present invention.

DETAILED DESCRIPTION OF THE INVENTION

A stable dispersion of a preformed polymer in a polyol can be prepared in a single mixer, optionally in the presence of a stabilizer, using a process of the present invention. Preferably the process is continuous. Such a stable dispersion can be prepared in less than six hours, typically less than two hours, preferably less than one hour. Preferably, the volume-average particle size of the dispersed polymer resin is in the micron or sub-micron range.

Polyols suitable for use in the present invention are desirably polyether polyols having functionalities (reactive hydrogens per molecule) of 2 to 8, preferably 2 to 4, and hydroxyl numbers of 70 to 5.61, preferably of 56 to 14. Desirably, the polyol has a low level of unsaturation. Unsaturation is a measure of allyl- or propenyl-type unsaturation in a polyol, resulting from propylene oxide isomerization during polyol manufacture. A low level of unsaturation corresponds to less than 0.05, preferably less than 0.04, more preferably less than 0.02 milliequivalents per gram (meq/g) of polyol. Polyols for use in the present invention can have unsaturation values of 0.007 meq/g or more, even 0.01 meq/g or more. Determine unsaturation according to American Society for Testing and Materials (ASTM) method D-4671.

Prepare polyols by reacting one or more alkylene oxides having 2 to 4 carbon atoms in the alkylene radical and an initiator molecule containing 2 to 8, preferably 2 to 4, active hydrogen atoms. Well-established manufacturing processes, such as anionic or cationic polymerization, are suitable for preparing these polyols. Suitable anionic polymerization processes may use alkali hydroxides such as sodium, potassium or cesium hydroxide, or alkali alcoholates such as sodium, potassium or cesium methylate, -ethylate or -isopropoxylate as catalyst(s). Suitable cationic polymerization processes may use Lewis acids such as antimony pentachloride, boronflouride-etherate or transition metal catalysts, such as cobalt, zinc or blends thereof.

Suitable alkylene oxides for the preparation of polyether polyols include tetrahydrofuran, 1,3-propylene oxide, 1,2- or 2,3-butylene oxide, styrene oxide and epichlorohydrin. Ethylene oxide and propylene oxide are preferred. The alkylene oxides may be used individually, alternating in sequence, or as mixtures. Possible initiator molecules include water, organic dicarboxylic acids, aliphatic and aromatic N-mono, N, N-, N, N'-dialkyl substituted diamines having 1 to 4 carbons in the alkyl radical, and mono-alkyl tertiary amines. Other initiator molecules include alkanolamines such as ethanolamine, diethanol amines N-methyl- and N-ethylene ethanolamines, diethanolamines, triethanolamine ammonia, hydrazine and hydrazide. Preferably used are multifunctional, particularly bi- and trifunctional alcohols such as ethylene glycol, propylene glycol, trimethylene glycol, diethylene glycol, dipropylene glycol, 1, 4-butane glycol, 1,6-hexamethylene glycol, glycerine, trimethylol propane, pentaerythritol, sorbitol and sucrose.

Polyether polyols suitable for use in the present invention have weight-averaged molecular weights of 200 to 15,000 and preferably of 500 to 8000. They may be used individually or in the form of mixtures.

Preferred polyols include propylene oxide-based polyols such as VORANOL® (trademark of The Dow Chemical Company) brand polyols.

Polymers suitable as preformed polymer resins in the present invention include thermoplastic polymers or mixtures thereof, that are polymerized prior to dispersing in a polyol. Polyethylene (PE) polymers including PE homopolymers, PE copolymers, graft-modified PE homo- and copolymers are examples of suitable preformed polymer resins. Polypropylene (PP) polymers and copolymers, polystyrene (PS) polymers and copolymers, elastomers, polyolefin waxes, and thermoplastic polyurethane resins are further examples of suitable preformed polymer resins.

Specific examples of preferred preformed polymer resins include linear low-density polyethylene (LLDPE) resins such as DOWLEX® (trademark of The Dow Chemical Company) 2500 and 2503 resins; high-density polyethylene (HDPE) resins such as DOWLEX IP-60 resin and UNIVAL® DMBA 8007 resin (UNIVAL is a trademark of Union Carbide Chemicals & Plastics Technology Corporation); low-molecular weight polyethylenes such as Marcus M-series polyethylenes from Marcus Oil and Chemical; elastomers such as polybutadiene, polyisoprene, polyisobutylene, ENGAGE® (trademark of DuPont Dow Elastomers L.L.C.) elastomer, AFFINITY® (trademark of The Dow Chemical Company) polyolefin elastomer, PELLATHANE® (trademark of The Dow Chemical Company) polyurethane elastomer, and TYRIN® (trademark of The Dow Chemical Company) chlorinated PE resin; polyolefin waxes such as EPOLENE®(trademark of Eastman Kodak Company) polyolefin wax; ethylene acrylic acid (EAA) copolymers such as PRIMACOR® (trademark of The Dow Chemical Company) resins; ethylene(meth)acrylate copolymers such as ethylene/methacrylate copolymers, ethylene/methylacrylate/glycidyl methacrylate copolymers, ethylene/butyl acrylate copolymers; ethylene vinyl acetate copolymers; ethylene/vinyl alcohol copolymers; polyvinyl alcohol; SAN polymers such as TYRIL® resins (TYRIL is a trademark of The Dow Chemical Company); and ISOPLAST® (trademark of The Dow Chemical Company) polyurethane engineering resin.

The preformed polymer, or mixture of polymers, can be self-dispersing, meaning that a stable dispersion of the polymer in a polyol can be prepared without adding an ancillary stabilizer. Examples of self-dispersing polymers include EAA copolymers, such as PRIMACOR resins. One skilled in the art can determine levels of appropriate EAA copolymer ratios for self-dispersing systems without undue experimentation.

Preformed polymer resin is generally present at less than 60 volume-percent (vol %), more generally less than 55 vol %, still more generally less than 50 vol % and preferably greater than 5 vol %, more preferably greater than 15 vol % based on total stable dispersion volume.

Stable dispersions containing preformed polymer resins that are not self-dispersing require a stabilizer. Stable dispersions of self-dispersing polymers can also include a stabilizer to enhance the dispersion stability or some other property. Suitable stabilizers can be anionic, cationic, nonionic, polymeric, or any compatible combination thereof.

Stabilizers used in stable dispersions for polyurethane foam applications will preferably be essentially free of functionalities that interfere with polyurethane foam and crosslinking chemistry. A stabilizer is considered "essentially free" of such functionalities if no detrimental affect to polyurethane crosslinking is observed when the stable dispersion is included in a polyurethane foam formulation. More preferably, the stabilizer will be completely free of interfering functionalities. Examples of functionalities that interfere with polyurethane foam and crosslinking chemistry include carboxylic acid groups, salts of carboxylic acids, and amine groups.

A preferred stabilizer for use in PE polymer polyols is a reaction product of a maleic anhydride functionalized PE wax and a monoamine polyol wherein imide linkages form between the reactants. One example of such a preferred stabilizer is the reaction product of CERAMER® (trademark of Baker Petrolite Corporation) 5005 wax with JEFFAMINE® (trademark of Huntsman Corporation) polyamine XTJ-507:

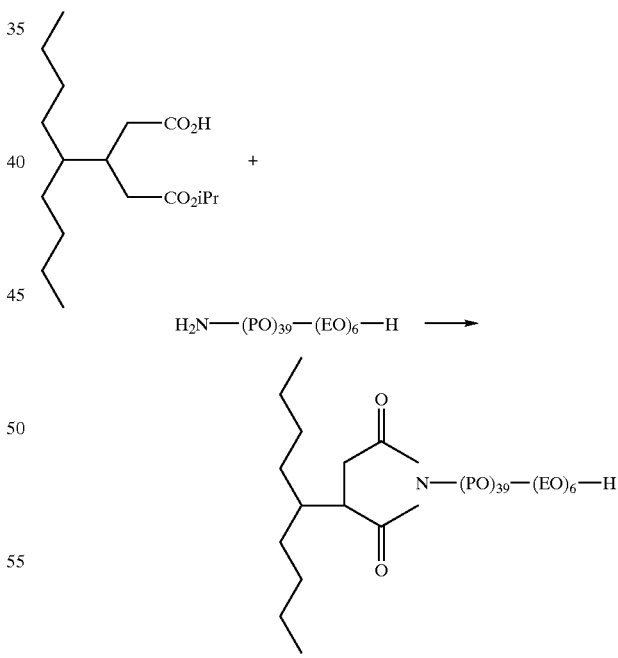

Another desirable stabilizer is a reaction product of an EAA copolymer with a monoamine polyol. Preferably, sufficient acid functionalities of the EAA copolymer are reacted to render the reaction product essentially free of acid functionalities.

The concentration of stabilizer, when used, is preferably less than 15 weight-percent, more preferably less than 10 weight-percent, most preferably less than 6 weight-percent based on total stable dispersion weight.

Apply a sufficient amount of heat (i.e., "sufficient heat") when forming an initial dispersion of the polymer in a polyol. Sufficient heat softens or melts the preformed polymer resin or resins being dispersed. Melting or softening the preformed polymer resin facilitates its dispersion into the polyol. Generally, heat a preformed polymer to a processing temperature that is often available from the preformed polymer's manufacturer. The processing temperature ($T_p$) is typically above the preformed polymer's glass transition temperature ($T_g$) and crystalline melt temperature for crystalline polymers. Desirably, sufficient heat forms a molten polymer from the preformed polymer resin. Many suitable sources of heat are available including steam, infrared radiation, sonicators, heating mantels, electric heating elements, and friction.

Also apply sufficient shear when dispersing a preformed polymer resin into a polyol. A preformed polymer resin has a particle size larger than desired in a stable dispersion of the present invention when first contacting a polyol. Sufficient shear breaks the preformed polymer resin into particles having a volume-average particle size desired for a stable dispersion. That is, sufficient shear reduces the particle size of a preformed polymer resin that is in contact with a polyol. Sufficient shear also disperses a desired preformed polymer resin (or resins) into a desired polyol at a given temperature. What constitutes sufficient shear depends on the preformed polymer and polyols in the initial dispersion, as well as the temperature of the polymer and polyol when applying shear. A skilled artisan can readily determine what constitutes sufficient shear for a given combination of preformed polymer, polyol and temperature.

Cool the initial dispersion, while under shear, to a temperature sufficiently low to form a stable dispersion. Cooling an initial dispersion to a temperature below the $T_p$ of the preformed polymer resin(s) dispersed therein is generally sufficient. Preferably, cool the initial dispersion to a temperature below the $T_g$ of the preformed polymer resin(s) dispersed therein. Many means of cooling are suitable. The initial dispersion often can sufficiently cool just by removing the heating source and allowing it to approach ambient temperature. A chilled fluid, such as water, applied to the outside of the mixer can accelerate cooling. One skilled in the art can identify methods for cooling that are most appropriate for their specific mixer configuration.

The process of the present invention involves breaking preformed polymer into a desired particle size while dispersing it in a polyol. This process is in contrast to a process that requires finely dividing a polymer solid prior to dispersing into a polyol, such as disclosed in U.S. Pat. No. 4,014,846 for example. Breaking a polymer into a desired particle size while dispersing in a polyol saves processing steps while manufacturing polymer in polyol dispersions.

Desirably, a stable dispersion of preformed polymer in polyol has a volume-average particle size of dispersed preformed polymer that is less then 15 microns, more preferably less than 10 microns, most preferably less than 5 microns and typically greater than 0.1 microns. Determine particle sizes using standard light scattering techniques.

The process of the present invention includes both batch and continuous processes. Examples of suitable sources of shear in a batch process include mixing blades such as a Cowles-type blade, high shear stator-rotor dispersers, and ultrasonic mixers. Preferably, the process is a continuous process wherein the mixer is an extruder. Typically, in the continuous process, the stabilizer (if used) and polyol addition occurs downstream of the preformed polymer resin addition, preferably after the preformed polymer resin is heated and melted. Preferably stabilizer and polyol addition coincides with elements designed to incorporate low viscosity fluids, such as gear mixer elements, in the extruder.

Typically, the extruder comprises a single or twin-screw configuration with any number and types of mixing elements and addition ports. A skilled artisan can determine any number of different configurations that would provide sufficient mixing for a system of interest without undue experimentation. Typically, the extruder comprises a zone of forward elements, or a combination of forward and reverse elements, where preformed polymer resin addition and heating occurs. Preferably, the extruder comprises a twin screw configuration with 2 or more zones containing gear mixers wherein stabilizer and polyol addition occurs. More preferably, the extruder comprises a twin screw configuration comprising a combination of forward and reverse element zones, 2 or more gear mixers, a stabilizer addition port coinciding with a gear mixer, and 2 or more polyol addition ports coinciding with gear mixers. Still more preferably, the extruder comprises a twin screw configuration comprising 5 or more gear mixers, a stabilizer addition port coinciding with one gear mixer, and two polyol addition ports coinciding with later gear mixers.

FIG. 1 is a preferred single mixer for use in the present invention comprising a twin-screw extruder and multiple feed ports (20). The twin screw comprises fowarding elements (22), gear mixers (24), blister elements (26), and reverse elements (28). Preformed polymer resin enters the extruder through a first feed port (2), coinciding with a forwarding element (22). The preformed polymer resin melts in the initial zone of forward mixing elements (4). A blend of stabilizer and polyol enters through the second feed port (6), coinciding with a gear mixer (24). Further downstream additional polyol enters through a third feed port (8) coinciding with a gear mixer. The stable dispersion exits the extruder through an exit port (10).

Stable dispersions of the present invention have utility as, for example, components of adhesive formulations and as reinforcing and/or softening additives in polyurethane foam formulations. The stable dispersions of the present invention, particularly dispersions of PE in polyol, also have utility as additives in polyurethane foam formulations for the purpose of providing heat sinks during curing of the foam. Dispersed polymer particles can absorb energy produced during curing of a polyurethane foam. See, for example U.S. Pat. No. 6,265,457 (incorporated herein by reference) for additional teaching on the use of polymer particles as heat sinks in polyurethane foam.

The following examples further illustrate, without limiting, the present invention.

EXAMPLE

Ex 1

Mix 30.0 grams of VORANOL 4703 polyol and 15.0 grams of poly(ethylene-co-ethyl acrylate) (Aldrich Chemical Company) in a 4-ounce (120 mL) glass bottle. Heat the mixture to 170° C. using a heat source, such as a heating mantel, while stirring at 1200 revolution per minute (RPM) using a 3 blade paddle mixer (Cole-Parmer catalog #P-04352-00). Increase the stirring rate to 4500 RPM and increase the temperature to 200° C. Remove the heat source and allow the mixture to cool to 90° C. while stirring at 4500

RPM. Ex 1 illustrates a self-dispersing polymer dispersed into a polyol to form a stable polymer polyol of the present invention prepared using a batch process of the present invention.

The volume-average particle size of the resulting stable dispersion is 1.4 microns. Measure the particle size by mixing a small amount of the stable dispersion in methanol and adding water containing 1-percent RHODAPEX™ (trademark of Rhodia) CO-436 brand surfactant. Measure the particle size in water.

Ex 2

Prepare a stable polymer in polyol dispersion as described in Ex 1 using 30.0 grams of VORANOL 4703 polyol and 15.0 grams of ELVAX™ (trademark of E.I. du Pont de Nemours Company) 210 poly(ethylene-co-vinyl acetate). The volume-average particle size is 21 microns, determined as described in Ex 1.

Ex 2 illustrates a self-dispersing polymer dispersed into a polyol to form a stable polymer polyol of the present invention prepared using a batch process of the present invention.

Preparation of Surfactant 1

Mix 150 grams of CERAMER 505 wax and 122.7 grams of JEFFAMINE XTJ-507 polyamine in a 1-liter kettle-type flask. Equip the flask with a mechanical stirrer and a nitrogen purge system. Set up the nitrogen purge system to allow either blanketing of the reaction with nitrogen or purging of the reaction flask with nitrogen. Pass the outlet of the nitrogen purge through a vacuum trap immersed in dry ice/acetone to trap out any volatiles.

Pass nitrogen through the flask for 15 minutes at room temperature to purge most of the air. Change the nitrogen flow to blanket the reaction mixture and immerse the flask in an oil bath at room temperature.

Heat the oil bath to 120° C. and hold at that temperature for one hour. Heat the oil bath to 150° C. for 15 minutes, then to 180° C. for 15 minutes. At this point the mixture is a clear homogeneous solution. Start the mechanical stirrer. A volatile condensate forms on the head of the reaction vessel.

Heat the oil bath to 200° C. for 15 minutes. Change the nitrogen flow to flow through the flask and into the cold traps, sweeping any volatile by-products out of the reaction vessel.

Heat the oil bath to 210° C. for 4 hours. Turn off the power to the oil bath and turn off the stirrer. Pull the stirrer blade/shaft assembly out of the liquid reaction mixture. Allow the entire assembly to cool to room temperature overnight under nitrogen.

The product (Surfactant 1) is a beige colored solid that is easily broken up and removed from the flask.

Ex 3

Feed DOWLEX brand polyethylene pellets into the extruder at a rate of 50 grams per minute (g/min). Operate the extruder at 450 RPM. Melt the polyethylene in the feed zone and convey downstream to an addition zone and add Surfactant 1 as a melt and VORANOL 3137 polyol at a feed rate of 8 g/min and 31 g/min, respectively. The temperature of the extruder in the feed zone is 150° C. The addition zone consists of high shear mixing elements suitable for incorporating liquids into viscous polymers. A gear mixer element is one example of an element suitable for this purpose. Reduce the temperature in the subsequent zones of the extruder in a stepwise manner until reaching a second addition zone. Add more polyol in this zone at a rate of 34 g/min. The second addition zone is 120° C. and also includes a high shear mixer. Continue conveying the mixture to the end of the extruder while mixing and cooling. Collect a stable dispersion as it exits the extruder at a temperature of 100° C. Optionally, use a water-cooled heat exchange system after the extruder to further reduce the temperature below 80° C. The volume-average particle size in the stable dispersion is 6 microns. Determine the particle size by mixing a sample of the stable dispersion in 2-propanol using a particle size analyzer.

Ex 3 illustrates a PE polymer polyol of the present invention prepared using a continuous extrusion process of the present invention.

Ex 4

Feed PRIMACOR brand ethylene-acrylic acid copolymer pellets into the extruder at a rate of 44 grams per minute (g/min). Operate the extruder at 450 RPM. Melt the polymer in the feed zone and convey downstream to an addition zone wherein add VORANOL 4702 polyol at a feed rate of 35 g/min. The temperature of the extruder in the addition zone is 145° C. The addition zone consists of high shear mixing elements suitable for incorporating liquids into viscous polymers. A gear mixer element is one example of an element suitable for this purpose. Reduce the temperature in the subsequent zones of the extruder in a stepwise manner until reaching a second addition zone. Add more polyol in this zone at a rate of 35 g/min. The second addition zone is 120° C. and also includes a high shear mixer. Continue conveying the mixture to the end of the extruder while mixing and cooling. Collect a stable dispersion as it exits the extruder at a temperature of 90° C. Optionally, use a water-cooled heat exchange system after the extruder to further reduce the temperature to below 80° C. The volume-average particle size in the stable dispersion is 1 micron. Determine the particle size by mixing a sample of the stable dispersion in 2-propanol using a particle size analyzer.

Ex 4 illustrates an EAA copolymer polyol of the present invention prepared by a continuous extrusion process of the present invention.

Ex 5

Feed a 50/50 mixture of PRIMACOR brand ethylene-acrylic acid copolymer (20 wt. percent acrylic acid content, 300 dg/min melt index) and EG 8400 ENGAGE ethylene-octene copolymer pellets into the extruder at a rate of 58 grams per minute (g/min). Operate the extruder at 250 RPM. Melt the polymer in the feed zone and convey downstream to an addition zone wherein add VORANOL 220-110N polyol at a feed rate of 60 g/min. The temperature of the extruder in the addition zone is 180° C. The addition zone consists of high shear mixing elements suitable for incorporating liquids into viscous polymers. A gear mixer element is one example of an element suitable for this purpose. Reduce the temperature in the subsequent zones of the extruder in a stepwise manner until reaching a second addition zone. Add more polyol in this zone at a rate of 175 g/min. The second addition zone is 120° C. and also includes a high shear mixer. Continue conveying the mixture to the end of the extruder while mixing and cooling. Collect a stable dispersion as it exits the extruder at a temperature of 80° C. Optionally, use a water-cooled heat exchange system after the extruder to further reduce the temperature to below 80° C. The volume-average particle size in the stable dispersion is 12 micron. Determine the particle size by mixing a sample of the stable dispersion in 2-propanol using a particle size analyzer.

Ex 5 illustrates a polymer polyol of the present invention containing both EAA copolymer and ethylene-octene copolymer of prepared by a continuous extrusion process of the present invention.

What is claimed is:

1. A process for making a stable dispersion comprising the steps:

(c) contacting, in a single mixer, a preformed polymer resin, a polyol and, if necessary or desired, a stabilizer under conditions of sufficient heat to melt the preformed polymer, thereby forming a polymer melt, and sufficient shear to form an initial dispersion of the polymer resin in the polyol; and (d) while under shear, cooling the initial dispersion sufficiently to form a stable dispersion;

wherein, said polyol is a polyether polyol having a weight-averaged molecular weight of between 500 and 8000.

2. The process of claim 1, wherein the preformed polymer resin is self-dispersing.

3. The process of claim 2, wherein the preformed polymer resin is an ethylene/acrylic acid copolymer.

4. The process of claim 1, wherein the initial dispersion is formed in the presence of a stabilizer.

5. The process of claim 4, wherein the stabilizer is an imide reaction product of a maleic anhydride functionalized polyethylene wax and a monoamine polyol.

6. The process of claim 4, wherein the preformed polymer resin is linear low-density polyethylene or high-density polyethylene.

7. The process of claim 1, wherein the single mixer is an extruder.

8. The process of claim 7, wherein the initial dispersion is formed in the presence of a stabilizer.

9. The process of claim 8, wherein the polyol and stabilizer are added downstream from the preformed polymer resin.

10. A composition comprising a stable dispersion of a stabilizer and a preformed high-density or linear low-density polyethylene polymer in a polyol; wherein the stabilizer stabilizes the dispersion of preformed high-density or linear low-density polyethylene polymer in the polyol.

11. The composition of claim 10, wherein the stabilizer is an imide reaction product of a maleic anhydride functionalized polyethylene wax and a monoamine polyol.

12. A polyurethane foam formulation comprising a dispersion of preformed polymer in polyol prepared according to the process of claim 1, wherein at least one of the following apply: (i) the stabilizer is an imide reaction product of a maleic anhydride functionalized polyethylene wax and a monoamine polyol; and/or (ii) the preformed polymer resin is selected from a group consisting of ethylene/acrylic acid copolymers.

13. The formulation of claim 12, wherein the preformed polymer is high-density or linear low-density polyethylene and wherein the dispersion contains a stabilizer that is an imide reaction product of a maleic anhydride functionalized polyethylene wax and a monoamine polyol.

14. An adhesive formulation comprising a dispersion of preformed polymer in polyol prepared according to the process of claim 1, wherein at least one of the following apply: (i) the stabilizer is an imide reaction product of a maleic anhydride functionalized polyethylene wax and a monoamine polyol; and/or (ii) the preformed polymer resin is selected from a group consisting of ethylene/acrylic acid copolymers.

* * * * *